United States Patent

[11] 3,600,502

[72] Inventors Loren B. Wagenaar
 Muncie, Ind.;
 Elmer J. Grimmer, Sharpsville, Pa.
[21] Appl. No. 880,228
[22] Filed Nov. 26, 1969
[45] Patented Aug. 17, 1971
[73] Assignee Westinghouse Electric Corporation
 Pittsburgh, Pa.

[54] ELECTRICAL CONDENSER BUSHING HAVING A PLURALITY OF CYLINDRICAL, INTERLEAVED, GROUND AND TAP LAYERS
 9 Claims, 5 Drawing Figs.
[52] U.S. Cl. .................................................. 174/143
[51] Int. Cl. .................................................. H01b 17/28
[50] Field of Search.......................................... 174/11.3,
 31, 73, 142, 143; 317/260; 307/109; 323/93, 128

[56] References Cited
UNITED STATES PATENTS
| | | | |
|---|---|---|---|
| 1,981,716 | 11/1934 | Austin.......................... | 323/93 X |
| 2,679,026 | 5/1954 | Frakes.......................... | 174/143 X |
| 3,462,545 | 8/1969 | Grimmer....................... | 174/143 |

Primary Examiner—Laramie E. Askin
Attorneys—A. T. Stratton, F. E. Browder and D. R. Lackey ABSTRACT: A condenser bushing including a conductor stud, insulating means disposed about the stud, and a plurality of radially spaced cylindrical layers of electrically conductive material disposed in the insulating means. The layers of electrically conductive material include interleaved ground and tap layers, to increase the total capacitance between tap and ground layers, and a voltage terminal connected to the tap layers.

PATENTED AUG 17 1971  3,600,502

INVENTORS
Elmer J. Grimmer and
Loren B. Wagenaar
BY
Donald R. Lackey
ATTORNEY

ELECTRICAL CONDENSER BUSHING HAVING A PLURALITY OF CYLINDRICAL, INTERLEAVED, GROUND AND TAP LAYERS

BACKGROUND OF THE INVENTION

1. Field of the Invention

The invention relates in general to electrical bushings, and more specifically to condenser bushings of the type suitable for use with power transformers and power circuit breakers.

2. Description of the Prior Art

Condenser-type bushings of the prior art, such as those used with power transformers and power circuit breakers, have a plurality of radially spaced cylindrical layers of electrically conductive material disposed in electrical insulation about the conductor stud, to grade radial and longitudinal voltage distribution throughout the insulating material of the bushing. The first or outermost layer is connected to ground, and the second or third layer is connected to an external terminal to provide a voltage source for bushing monitoring devices, or for such applications as synchronizing, relaying, power factor tests on the bushing insulation, and the like.

The ratio of the capacitance between the conductor stud and tap layer, which will be referred to as C1, and the capacitance between the tap layer and the ground layer, which will be referred to as C2, must be set to a predetermined value in order to uniformly distribute electrical stress across the bushing insulation, as well as to provide a voltage and power capability at a tap point which is within the range for which bushing potential or monitoring devices are designed. To obtain the desired ratio of capacitance invariably creates a problem of how to make C2 large enough. Increasing capacitance C2 is not as simple as increasing the area of the tap and ground layers, or decreasing the spacing between the tap and ground layers. Increasing the areas of the tap and ground layers increases the axial length of the bushing, at a time when bushing length is already a problem from the standpoint of support, in EHV apparatus. Increasing the axial length requires the layers between the stud and tap layer to be increased in length, to maintain proper longitudinal stress distribution, which increases C1 thus making this expedient self-defeating. The spacing between the tap and ground layers is determined by the 60 second withstand voltage test of 20 KV minimum across the tap-to-ground insulation, as specified by USASI C76.1. Reducing the thickness of this insulation may, therefore, cause objectionably high dielectric gradients in the insulation between the tap and ground layers during this test.

The use of split or axially divided layers between the conductor stud and tap layer aggravates the problem of obtaining the required ratio of C1 to C2, as it decreases the total radial build of the condenser section, increasing the capacitance C1 from the stud to the tap layer while the capacitance C2 from the tap to ground layers has remained fixed due to the spacing required for the 60 second withstand test. Since voltage is distributed across serially connected capacitors inversely proportional to their values, increased voltage stress is transferred to the insulation between the tap and ground layers.

Therefore, it would be desirable to be able to increase the capacitance C2 between the tap and ground layers, in order to obtain the desired ratio between C1 and C2, but the increase in the magnitude of C2 must not be achieved by increasing the axial length of the ground and tap layers, or by decreasing the spacing between the ground and tap layers.

SUMMARY OF THE INVENTION

Briefly, the present invention is a new and improved condenser bushing which increases the capacitance between the tap and ground layers of the capacitor plates, without increasing the axial length of the bushing, and without decreasing the spacing between the tap and ground layers. The increased capacitance between the tap and ground layers is provided by adding a plurality of layers of conductive material outside the tap layer, while maintaining the required spacing between all of these additional layers as required by the 60 cycle withstand test. Then, alternate layers are connected to the tap layer and the intervening layers are connected to the ground. This arrangement effectively connects the capacitances between these additional layers in parallel, causing their values to add.

Since this arrangement substantially increases the total area of the tap and ground layers, the axial length of the tap and ground layers may be reduced, enabling the critical longitudinal dimension of the bushing to be decreased at the expense of only a slight increase in the radial build of the capacitor section, which dimension is not as critical.

BRIEF DESCRIPTION OF THE DRAWINGS

Further advantages and uses of the invention will become more apparent when considered in view of the following detailed description and drawings, in which.

DESCRIPTION OF THE PREFERRED EMBODIMENTS

Figure 1:
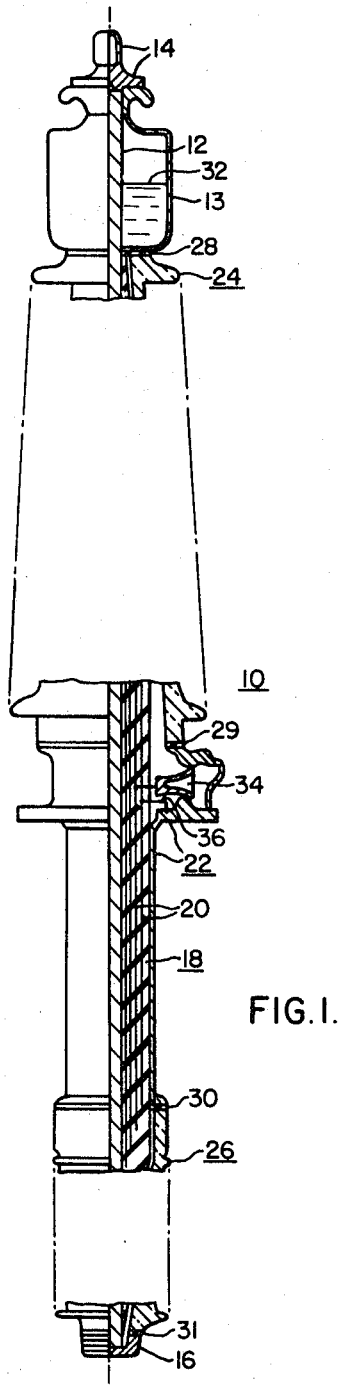
FIG. 1 is an elevational view, partially in section, of a condenser bushing of the type which may utilize the teachings of the invention.

Referring now to the drawings, and FIG. 1 in particular, there is shown an elevational view of a condenser bushing 10 or the type which may utilize the teachings of the invention. Bushing 10, which may be used with power transformers or power circuit breakers, has a generally elongated shape, and includes a centrally and axially disposed electrically conductive stud 12, which is constructed of a good electrical conductor, such as copper or aluminum. Conductor stud 12 is terminated at its upper end by an expansion bowl 13 and a suitable terminal cap assembly 14, which is adapted for connection to an external electrical conductor, and at its bottom end by terminal means 16, which is adapted for connection to a conductor of the associated electrical apparatus. The electrical conductor 12 has an insulating or condenser section 18 disposed thereon, which may be formed of layers of insulating material having a plurality of spaced metallic foil sheets 20 disposed therein to form cylindrical capacitor plates to grade the radial and longitudinal voltage distribution in the bushing. The insulating or condenser section 18 may be formed by winding a high quality paper on the electrical conductor 12 while under a predetermined uniform tension, and feeding in metallic foil sheets or capacitor plates 20 at predetermined intervals to provide a plurality of series capacitors. Since it is desirable to uniformly grade the radial voltage across condenser section 18, the capacitance of each section should preferably be equal. Thus, as the diameter of the capacitor plates 20 increases, the longitudinal lengths of the plates decrease, in order to maintain the same surface area. The graduated length of the foil layers 20 provides graded voltage longitudinally or axially along the length of the bushing.

The condenser section 18 is oil impregnated to fill all of the voids in the structure and prevent the formation of corona, and also provide a minimum power factor to minimize dielectric heating of the structure.

A grounded metallic flange assembly 22 is disposed intermediate the ends of the bushing 10 and adjacent the condenser section 18, providing the means for attaching the bushing 10 to a transformer or circuit breaker casing. Shell-like insulating members 24 and 26, constructed grade an electrical grade of porcelain having a glazed, corrugated outer surface for providing additional creep distance, or of a suitable resin, such as an epoxy resin, are disposed between the flange assembly 22 and the upper terminal 14, and between the flange assembly 22 and the bottom terminal 16, respectively. The ends of the shell members 24 and 26 are machined flat and parallel to provide surfaces for gaskets, such as gaskets 28, 29, 30 and 31, for hermetically sealing the bushing 10. Shell members 24 and 26 provide weatherproof insulating means between the ends of the bushings and central grounded flange assembly 22, and also provide a container for an insulating and cooling fluid 32, such as mineral oil, with which the bushing 10 is filled.

Bushing 10 also includes a voltage tap receptacle 34 connected to the tap layer of the condenser section 18, which is disposed between the conductor stud 12 and the ground layer of the condenser section. The ground layer of the condenser section is connected to the metallic flange assembly 22, via conductor 36, and is thus grounded when the bushing 10 is mounted on the grounded casing of its associated electrical apparatus. In some instances, the grounded metallic flange may be used as the ground layer.

While bushing 10 has been described as having a capacitor section formed of layers of paper interspersed with radially spaced layers of electrically conductive material to provide capacitor plates, it is to be understood that the condenser section 18 may be formed by any suitable manner, such as by winding the capacitor section with resin impregnated paper, such as epoxy resin, adding sheets of foil as required, or by casting the capacitor plates in a liquid resinous insulation system, such as an epoxy or polyester resin, which resin system is subsequently cured to a solid. In the latter instance, the entire insulating structure of the bushing, including the weather sheds, may be formed of the cast resin, such as illustrated in U.S. Pat. No. 3,394,455, which patent is assigned to the same assignee as the present application. Further, the capacitor plates may be sheets, foils, or coatings of a good electrical conductor, such as copper or aluminum, or they may be sheets or coatings of partially conductive material, such as those containing carbon, or they may be sheets or coatings of semiconductive material, i.e., material having a distinct voltage dependent resisting, such as those containing silicon carbide.

Figure 2:
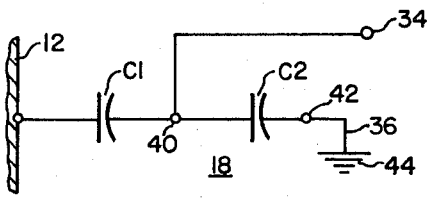
FIG. 2 is a schematic diagram of the capacitor section of a condenser bushing, illustrating the tapping of the structure to obtain a voltage source for external use.

The condenser section 18 of bushing 10 is illustrated schematically in FIG. 2, with like reference numerals in FIGS. 1 and 2 indicating like components. Point 40 of FIG. 2 indicates the tapped layer of condenser section 18, and point 42 indicates the ground layer, connected to ground 44 via conductor 36. Capacitance $C_1$ represents the total capacitance between the conductor stud 12 and the tap layer 40, and capacitance $C_2$ represents the total capacitance between the tap layer 40 and the ground layer 42. Voltage receptacle or terminal 34 is connected to the tap layer 40 to provide the voltage source required for the operation of external apparatus, such as bushing potential devices, or for operating relaying or synchronizing devices, and the like.

The extra high voltages now being transmitted by electrical utilities require that the apparatus associated therewith, such as power transformers and power circuit breakers have unusually long bushings, which presents a problem in mounting and supporting the bushings. The bushings for EHV apparatus also present a problem in developing the proper ratio of the capacitance $C_1$ from the conductor stud to the tap layer 40, to the capacitance $C_2$ from the tap layer 40 to the ground layer 42, with the difficulty being to increase $C_2$ to the required magnitude. A normally ungrounded tap, with low tap to ground capacitance, would be subjected to more than its share of electrical stress in the insulation between the tap and ground layers, and an increased stud to tap layer capacitance and a low tap layer to ground capacitance causes difficulty in obtaining the proper voltages and wattages for coordination with standard bushing potential devices. Increasing the tap to ground capacitance by increasing the axial length of the tap and ground layers adds to the overall length of the bushing, which is undesirable, and it also adds more capacitance from the stud to the tap layer due to the longer bushing. Decreasing the radial spacing between the tap and ground layers is not desirable, as the spacing is determined by the maximum stress the insulation between the tap and ground layers will be subjected to during the standard 60 second withstand voltage test applied to this insulation.

This invention teaches how to increase the capacitance $C_2$ from the tap to ground layers, without increasing the length of the bushing, without increasing the stud to tap layer capacitance, and without reducing the spacing between the tap and ground layers, and in fact may be used to effect a reduction in the overall length of the bushing.

Figure 3:
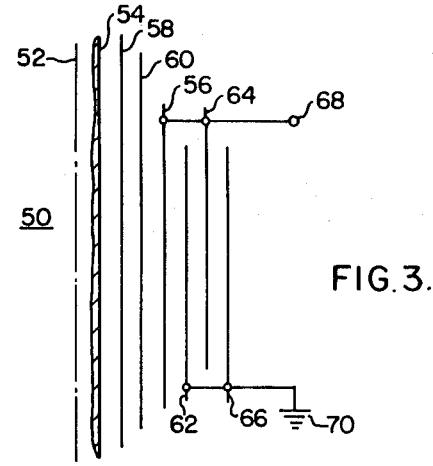
FIG. 3 is a diagrammatic view of the capacitor plates of a condenser bushing, constructed and arranged according to an embodiment of the invention.

FIG. 3 is a diagrammatic view of a condenser section 50 of an electrical bushing, which illustrates a first embodiment of the invention. Condenser section 50 is illustrated in a sectional, elevational view, symmetrical about centerline 52, with the solid insulation between conductive layers not being shown in order to more clearly set forth the capacitance structure. Line 54 in FIG. 3 indicates the conductor stud, line 56 indicates the tap layer of the capacitive plate structure, and lines 58 and 60 indicate any desired number of layers of conductive material between the stud 54 and tap layer 56, as required by a specific application. In the prior art, the second or third conductive layer would ordinarily be the tap layer, with any intervening conductive layers being unconnected, but according to the teachings of this invention, a plurality of additional layers are provided outside the conventional tap layer 56, with these layers being connected to predetermined other layers. The radial spacing between the plurality of additional layers is the same as would be required between adjacent tap and ground layers of a similarly rated prior art bushing. In this embodiment, three additional layers 62, 64 and 66 are provided outside the tap layer 56. It is not sufficient to merely increase the spacing between the tap and outer layer, and then dispose additional layers of conductive material between them, however, as the various capacitances between the layers will be in series. Therefore, the next steps, according to the teachings of the invention, are to interconnect alternate layers, starting with tap layer 56, and progressing radially outward, and connect these interconnected layers to the voltage terminal 68. Then, the remaining layers are interconnected to ground 70. Thus, layers 56 and 64 are not tapped layers, interleaved with layers 62 and 66, which are ground layers. It is important that the innermost layer 56 of the interleaved group of layers be connected to the voltage tap 68, and not to ground. The outermost layer is usually a ground layer, but it could be a tap layer, if desired. For example, the outermost layer may be a tap layer when sufficient insulation is included between the outermost layer and the grounded metallic flange to effectively make the flange the outermost grounded layer. Therefore, instead of one capacitor being created, and since they are connected in parallel by the interleaving connections, the capacitance of the tap to ground layers is now approximately three times what it would be using prior art practice.

Since the required tap and ground layer area may be provided, according to the teachings of the invention, by using a plurality of radially spaced, interleaved tap and ground layers, the longitudinal lengths of the tap and ground layers may now be reduced, with the required area of the tap and ground layers being achieved by selecting the proper number and lengths of interleaved layers. Reducing the axial length of the tap and ground layers enables a reduction to be made in the overall length of the capacitor section, and the overall length of the bushing, which is extremely desirable for bushings in the EHV class. The reduction in axial dimension of the bushing is accomplished by only a slight increase in radial build dimension of the capacitor section.

Figure 4:
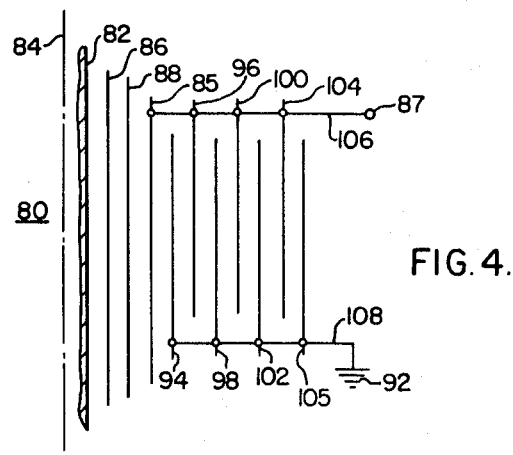
FIG. 4 is a diagrammatic view of the capacitor plates of a condenser bushing, illustrating another embodiment of the invention.

FIG. 4 is a diagrammatic view of a capacitor section 80 for a condenser bushing, symmetrical about centerline 84, which illustrates how the area of the ground and tap layers may be increased beyond that shown in the embodiment of FIG. 3, as required to provide any desired C1 to C2 ratio, and/or to reduce the axial length of the tap and ground layers, and thus the overall length of the bushing. Line 82 represents the conductor stud of the bushing, line 85 represents the innermost tap layer, which is connected to voltage tap 87 via conductor 106, lines 86 and 88 represent any desired number of layers of conductive material between the conductor stud 82 and the innermost tap layer 85, and layers 94, 96, 98, 100, 102, 104 and 105 are disposed outside the tap layer 85, with these layers being radially spaced apart according to the spacing required between conventional tap and ground layers of the prior art. Alternate layers, starting with tap layer 85, are interconnected via conductor 106, and the remaining layers 94, 98, 102 and 105 are interconnected via conductor 108, and to ground 92. This arrangement increases the tap to ground capacitance about seven times, and it will be apparent how any desired plurality of layers may be disposed outside the tap layer and connected to effect almost any desired capacitance. Layer 105 may be similar to the outer conductive layers, or it may be the grounded flange of the bushing, as desired.

Figure 5:
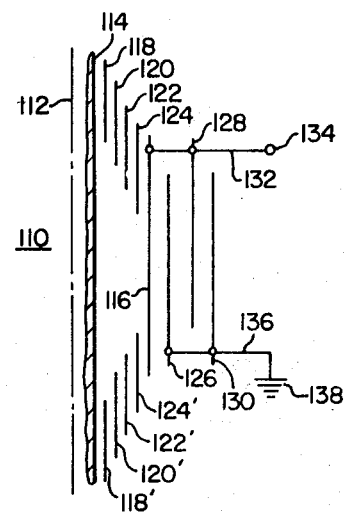
FIG. 5 is a diagrammatic view illustrating the teachings of the invention applied to a condenser bushing of the type which utilizes axially divided layers between the conductor stud and tap layer.

FIG. 5 is a diagrammatic view of a capacitor section 110 for a condenser bushing, symmetrical about centerline 112, illustrating that the teachings of the invention may be applied with equal facility to condenser bushings in which the capacitor plates located between the conductor stud and tap layer are axially divided. Specifically, line 114 represents the conductor stud, line 116 indicates the tap layer, with any number of axially divided layers being disposed between the conductor stud 114 and tap layer 116, as required by the specific application. For example, four axially divided layers are illustrated in FIG. 5, with the upper layers being indicated by reference numerals 118, 120, 122 and 124, and with the lower counterparts of these layers being given the same reference numerals with a prime mark. Three layers indicated by lines 126, 128, and 130 are disposed outside the tap layer 116, with conductor 132 connecting tap layer 116 and layer 128 to the voltage tap 134, and with conductor 136 connecting layers 126 and 130 to ground 138. Layer 130 may be similar to the outer layers, or it may be the grounded flange. The interleaved tap and ground plate structure is especially suitable for bushings with axially divided capacitor plates between the stud and tap layers, as the axially divided layers enables the layers to be disposed closer together, increasing the value of capacitance C1, and making it more imperative that the value of capacitance C2 between the ground and tap layers be increased.

In summary, there has been disclosed a new and improved condenser bushing structure, which enables the solid insulation across the condenser section to be more uniformly stressed, including the insulation from an ungrounded tap layer to ground, without increasing the overall length of the bushing, and without decreasing the radial spacing between the tap and ground layers. This result is achieved by adding a plurality of cylindrical layers of conductive material about the tapped layer, and connecting alternate layers to the tap layer, and the remaining layers is ground. This interleaved structure connects the capacitances in parallel, causing the values of the capacitance to add and greatly increase the magnitude of the tap to ground capacitance. The length of a condenser type bushing is partially determined by the area of the ground and tap layers required. The teachings of the invention enable the required area of the tap and ground layers to be obtained, while reducing the axial length of these layers, thus effecting a reduction in the overall length of the bushing.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

We claim:
1. An electrical condenser bushing, comprising:
an axially extending conductor stud,
solid insulating means disposed about said conductor stud,
radially spaced, substantially cylindrical layers of electrically conductive material disposed in said solid insulating means about, and coaxial with, said conductor stud, including a tap layer and a plurality of layers disposed outside said tap layer,
means electrically connecting said tap layer to certain of the layers disposed outside said tap layer,
and means electrically interconnecting the layers outside said tap layer which are not connected to the tap layer, with these layers being adapted for connection to ground,
at least certain of the layers connected to said tap layer being interleaved by layers adapted for connection to ground.

2. The electrical bushing of claim 1 including an accessible terminal, and means electrically connecting said terminal to the tap layer.

3. The electrical condenser bushing of claim 1 wherein the radially spaced layers of electrically conductive material also include layers disposed between the tap layer and the conductor stud.

4. The electrical condenser bushing of claim 3 wherein at least certain of the layers disposed between the conductor stud and tap layer are axially discontinuous.

5. The electrical condenser bushing of claim 3 wherein at least certain of the layers disposed between the conductor stud and tap layer include two axially spaced sections.

6. An electrical condenser bushing comprising:
an axially extending conductor stud,
solid insulating means disposed about said conductor stud,
a plurality of radially spaced, substantially cylindrical, layers of electrically conductive material disposed in said solid insulating means, about, and coaxial with, said conductor stud, providing capacitor plates about said conductor stud,
first means electrically interconnecting a predetermined number of alternate layers, starting with the next to the outermost layer,
second means interconnecting the layers intervening those connected by said first means, and the outermost layer, said second means being adapted for construction to ground,
and terminal means connected to said first means to provide a voltage tap.

7. The electrical bushing of claim 6 wherein the outermost layer is part of a metallic mounting flange assembly.

8. The electrical condenser bushing of claim 6 including a plurality of layers of electrically conductive material disposed between the innermost layer connected to the terminal means and the conductor stud, said plurality of layers each being axially divided into first and second sections.

9. An electrical condenser bushing, comprising:
a conductor stud,
solid insulating means disposed about said conductor stud,
a plurality of radially spaced, substantially cylindrical, layers of electrically conductive material disposed in said solid insulating means, about, and coaxial with said conductor stud, including a plurality of interleaved ground and tap layers,
and terminal means connected to said tap layers.